United States Patent
Baumgart et al.

(10) Patent No.: US 6,534,185 B1
(45) Date of Patent: Mar. 18, 2003

(54) COATING AGENT WITH A MACROMER UNIT FOR THE PRODUCTION OF MULTI-LAYERED COATINGS

(75) Inventors: Hubert Baumgart, Münster (DE); Thomas Farwick, Billerbeck (DE); Ulrich Poth, Münster (DE); Ulrike Röckrath, Sended (DE); Andrea Zumbrink, Reken (DE)

(73) Assignee: BASF Coatings AG, Muenster-Hiltrup (DE)

( * ) Notice: Subject to any disclaimer, the term of this patent is extended or adjusted under 35 U.S.C. 154(b) by 0 days.

(21) Appl. No.: 09/807,711
(22) PCT Filed: Oct. 6, 1999
(86) PCT No.: PCT/EP99/07504
§ 371 (c)(1), (2), (4) Date: Jun. 18, 2001
(87) PCT Pub. No.: WO00/26309
PCT Pub. Date: May 11, 2000

(30) Foreign Application Priority Data

Oct. 31, 1998 (DE) .......................... 198 50 254
Dec. 12, 1998 (DE) .......................... 198 57 465

(51) Int. Cl.[7] .................... B32B 9/00; B32B 27/30
(52) U.S. Cl. .................. 428/447; 525/100; 525/101; 427/384; 427/387; 427/388.2
(58) Field of Search ............ 428/447; 525/101–106, 525/427, 384, 387, 388.2; 11/11

(56) References Cited

U.S. PATENT DOCUMENTS

| | | | |
|---|---|---|---|
| 3,639,147 A | 2/1972 | Benefiel et al. | 117/73 |
| 3,953,644 A | 4/1976 | Camelon et al. | 428/220 |
| 4,710,542 A | 12/1987 | Forgione et al. | 525/127 |
| 4,719,132 A | 1/1988 | Porter, Jr. | 427/409 |
| 4,754,014 A | 6/1988 | Ryntz et al. | 528/28 |
| 4,939,213 A | 7/1990 | Jacobs, III et al. | 525/329.9 |
| 5,084,541 A | 1/1992 | Jacobs, III et al. | 528/45 |
| 6,297,314 B1 * | 10/2001 | Hintze-Bruning et al. | 524/589 |

FOREIGN PATENT DOCUMENTS

| | | | |
|---|---|---|---|
| DE | 33 33072 A1 | 9/1973 | ............ C09D/3/72 |
| DE | 28 18 100 A1 | 4/1977 | ............ B05D/7/18 |
| DE | 37 06 095 A1 | 8/1987 | ............ C08G/77/20 |
| DE | 36 28 124 A1 | 3/1988 | ............ C09D/3/727 |
| DE | 38 07 571 A1 | 9/1988 | ............ C08L/83/07 |
| DE | 38 14 853 A1 | 11/1988 | ............ C25D/13/06 |
| DE | 39 03 804 A1 | 8/1990 | ............ C09D/175/06 |
| DE | 44 21 823 A1 | 1/1996 | ............ C09D/175/04 |
| DE | 196 13 547 A1 | 11/1996 | ............ C09D/5/416 |
| EP | 0 038127 A1 | 3/1981 | ............ B05D/7/26 |
| EP | 0 069 936 A2 | 7/1982 | ............ C09D/3/00 |
| EP | 0 089 497 B2 | 2/1983 | ......... C09D/175/04 |
| EP | 0 195 931 A1 | 2/1986 | ............ C09D/3/80 |
| EP | 0 228 003 B1 | 12/1986 | ............ C08G/18/08 |
| EP | 0 228 003 B2 | 12/1986 | ............ C08G/18/08 |
| EP | 0 245 700 B1 | 4/1987 | ......... C07D/251/54 |
| EP | 0 320 552 A1 | 12/1987 | ............ B05D/7/16 |
| EP | 0 297 576 A1 | 6/1988 | ............ C09D/3/72 |
| EP | 0 358 153 B1 | 9/1989 | ......... C09D/143/04 |
| EP | WO 92/22615 | 12/1992 | ......... C09D/151/08 |
| EP | 0 604 922 A1 | 12/1993 | ........ C08K/5/3492 |
| EP | 0 624 577 A1 | 5/1994 | ......... C07D/251/70 |
| EP | 0 260 47 A2 | 8/1997 | ......... C08F/283/10 |
| GB | 2 012 191 A | 12/1978 | ............ B05D/1/36 |

OTHER PUBLICATIONS

Elsevier Sequoia Progress in Organic Coatings, 22 (1993) pp. 27–36, entitled "Scratch resistant clear coats: development of new testing method for improved coatings".

Eugen Müller, entitled "Methoden Der Organischen Chemie" 1963, Title page, and 61–70.

* cited by examiner

Primary Examiner—Margaret G. Moore
Assistant Examiner—Christopher Keehan

(57) ABSTRACT

A coating composition comprising
- A) at least one hydroxyl-containing polyacrylate containing in copolymerized form at least one polysiloxane macromonomer as binder and
- B) at least one tris(alkoxycarbonylamino)triazine as crosslinking agent, and its use to produce multicoat clearcoats and multicoat topcoats.

13 Claims, No Drawings

COATING AGENT WITH A MACROMER UNIT FOR THE PRODUCTION OF MULTI-LAYERED COATINGS

The present invention relates to a novel coating composition which comprises a hydroxyl-containing polyacrylate as binder and a tris(alkoxycarbonylamino) triazine as crosslinking agent. The present invention further relates to the use of the novel coating composition to produce novel scratch-resistant clearcoats, especially for motor vehicles. The present invention additionally relates to a novel process for producing multicoat topcoats.

Coating compositions which comprise a hydroxyl-containing polyacrylate as binder and a tris(alkoxycarbonylamino)triazine as crosslinking agent are known from the European patent EP-A-0 604 992. These known coating compositions mandatorily include an acidic crosslinking catalyst, which may cause problems when they are used to produce clearcoats. For instance, the crosslinking catalysts may be fused to the underlying pigmented basecoat and impair the intercoat adhesion and the optical properties of the basecoat/clearcoat system. Moreover, these known clearcoats do not possess the scratch resistance which is a future requirement of the market, especially of the automobile manufacturers and the auto buyers.

The patent WO 92/22615 discloses clearcoat materials whose binders contain up to 5% by weight of polysiloxane macromonomers in copolymerized form. Higher proportions are regarded as deleterious. These clearcoat materials are applied directly to metallic basecoat films and baked together with them (wet-on-wet technique). The crosslinking of these clearcoat materials is by way of epoxide and carboxyl groups. This results in free hydroxyl groups, which may impair the weathering stability. Moreover, the use of these clearcoat materials as sole clearcoat materials may lead to an undesirably high silicone loading in the circuits of the coating plants.

It is an object of the present invention to find a novel coating composition for the preparation of a novel clearcoat material which no longer has the disadvantages of the prior art but which instead gives highly scratch-resistant topcoats which exhibit a so-called "maintenance free", effect. These advantages ought not to be acquired at the expense of an undesirably high silicone loading in the circuits. Moreover, the novel coating material or the novel clearcoat material should no longer be tied to crosslinking by way of the epoxide and carboxyl groups but instead should be based on a system which, on crosslinking, gives a weathering-stable polyurethane network. A further object of the present invention is to propose a novel multicoat clearcoat system which provides the aforementioned advantages without any problems of delamination.

The invention accordingly provides the novel coating composition which comprises A) at least one hydroxyl-containing polyacrylate containing in copolymerized form at least one polysiloxane macromonomer as binder and B) at least one tris(alkoxycarbonylamino)triazine as crosslinking agent.

In the text below, the novel coating composition or the novel clearcoat material is referred to as the "coating composition of the invention" or "clearcoat material of the invention".

The invention additionally provides the novel process for producing multicoat clearcoats, in which (1) at least one clearcoat film is applied to the substrate surface and baked, and then (2) the coating composition of the invention is applied and likewise baked.

The invention further provides the novel process for producing a multicoat topcoat on a substrate, in which (1) a pigmented basecoat material is applied to the substrate surface, (2) the basecoat film applied in process step (1) is dried, (3) a nonaqueous transparent clearcoat material is applied to the basecoat film dried in process step (2), (4) and then the basecoat film and the clearcoat film are baked together, which involves applying to the baked clearcoat (5) a further clearcoat film of the coating composition of the invention, and then (6) baking it.

In the text below, the two novel processes for producing a multicoat clearcoat and for producing a multicoat topcoat are referred to collectively as the "processes of the invention".

The invention not least provides the novel multicoat clearcoat and the novel multicoat topcoat which both comprise (I) at least one clearcoat and (II) at least one clearcoat obtainable from the coating composition of the invention.

In the text below, the novel multicoat clearcoat is referred to as the "multicoat clearcoat of the invention" and the novel multicoat topcoat is referred to as the "topcoat of the invention".

In the light of the prior art there was no reason to expect that the object on which the present invention is based could be achieved by means of the coating composition of the invention.

The first key constituent of the coating composition of the invention is the binder (A). In accordance with the invention this binder comprises a hydroxyl-containing polyacrylate containing in copolymerized form at least one polysiloxane macromonomer.

Suitable polyacrylate resins for use in the coating composition of the invention include in principle all polyacrylate resins (A) having an OH number of from 80 to 200 mg KOH/g and an acid number <20 mg KOH/g. The polyacrylate resins preferably have a number-average molecular weight Mn of from 1500 to 30,000, more preferably from 2000 to 15,000, and in particular from 2500 to 5000.

Particular preference is given to the use of the polyacrylate resins (A) obtainable by polymerizing the following monomers in an organic solvent or solvent mixture and in the presence of at least one polymerization initiator, and in the presence or absence of regulators:

a1) a (meth)acrylic ester which is different from but copolymerizable with (a2), (a3), (a4), (a5), (a6) and (a7) and is substantially free from acid groups, or a mixture of such monomers, a2) an ethylenically unsaturated monomer which is copolymerizable with (a1), (a3), (a4), (a5), (a6), and (a7), is different from (a5), carries at least one hydroxyl group per molecule, and is substantially free from acid groups, or a mixture of such monomers, a3) an ethylenically unsaturated monomer which carries per molecule at least one acid group which can be converted into the corresponding acid anion group, and which is copolymerizable with (a1), (a2), (a4), (a5), (a6), and (a7), or a mixture of such monomers, a4) if desired, one or more vinylaromatic hydrocarbons, a5) and, if desired, at least one reaction product of acrylic acid and/or methacrylic acid with the glycidyl ester of an alpha-branched monocarboxylic acid having from 5 to 18 carbon atoms per molecule (e.g., the glycidyl esters available commercially under the name Cardura®) or, instead of the reaction product, an equivalent amount of acrylic and/or methacrylic acid which is then reacted, during or after the polymerization reaction, with the glycidyl ester of an alpha-branched monocarboxylic acid (e.g., the glycidyl esters available commercially under the name Cardura®) having from 5 to 18 carbon atoms per molecule, a6) at least one polysiloxane macromonomer described in detail below and intended for use in accordance with the invention, and a7) if desired, an ethylenically unsaturated monomer which is copolymerizable but different from (a1), (a2), (a3), (a4), (a5) and (a6) and is substantially free from acid groups, or a mixture of such monomers, the nature and amount of (a1), (a2), (a3), (a4), (a5), (a6) and (a7) being selected such that the polyacrylate resin (A) has the desired OH number, acid number, and molecular weight.

To prepare the polyacrylate resins (A) used in accordance with the invention, use may be made as component (a1) of any ester of (meth)acrylic acid which is copolymerizable with (a2), (a3), (a4), (a5), (a6) and (a7) and is substantially free from acid groups, or a mixture of such (meth)acrylic esters. Examples include alkyl acrylates and alkyl methacrylates having up to 20 carbon atoms in the alkyl radical, such as methyl, ethyl, propyl, n-butyl, sec-butyl, tert-butyl, hexyl, ethylhexyl, stearyl, and lauryl acrylate or methacrylate, for example, or cycloaliphatic (meth)acrylic esters, such as cyclohexyl (meth)acrylate, isobornyl (meth)acrylate, dicyclopentadienyl (meth)acrylate, and tert-butylcyclohexyl (meth)acrylate.

As component (a1) it is also possible to use ethyl triglycol (meth)acrylate and methoxyoligoglycol (meth)acrylate having a number-average molecular weight Mn of preferably 550, or other ethoxylated and/or propoxylated, hydroxyl-free (meth)acrylic acid derivatives.

As component (a2) it is possible to use ethylenically unsaturated monomers which are copolymerizable with (a1), (a3), (a4), (a5), (a6), and (a7), are different from (a5), carry at least one hydroxyl group per molecule, and are substantially free from acid groups, or a mixture of such monomers. Examples include hydroxyalkyl esters of acrylic acid, methacrylic acid or another alpha, beta-ethylenically unsaturated carboxylic acid. These esters may be derived from an alkylene glycol, which is esterified with the acid, or may be obtained by reacting the acid with an alkylene oxide. As component (a2) it is preferred to use hydroxyalkyl esters of acrylic acid or methacrylic acid in which the hydroxyalkyl group contains up to 20 carbon atoms, reaction products of cyclic esters, such as epsilon-caprolactone, for example, and these hydroxyalkyl esters, or mixtures of these hydroxyalkyl esters and/or epsilon-caprolactone-modified hydroxyalkyl esters.

Examples of such hydroxyalkyl esters include 2-hydroxyethyl acrylate, 2-hydroxypropyl acrylate, 3-hydroxypropyl acrylate, 2-hydroxypropyl methacrylate, 3-hydroxypropyl methacrylate, 2-hydroxyethyl methacrylate, 4-hydroxybutyl acrylate, 4-hydroxybutyl methacrylate, methylpropanediol monoacrylate, methylpropanediol monomethacrylate, hydroxystearyl acrylate, and hydroxystearyl methacrylate. Corresponding esters of other unsaturated acids, such as ethacrylic acid, crotonic acid, and similar acids having up to about 6 carbon atoms per molecule, for example, may also be used.

As component (a2) it is also possible to use olefinically unsaturated polyols. Preferred polyacrylate resins (A) are obtained if trimethylolpropane monoallyl ether is used, at least in part, as component (a2). The fraction of trimethylolpropane monoallyl ether is customarily from 2 to 10% by weight, based on the overall weight of the monomers (a1) to (a7) used to prepare the polyacrylate resin. In addition, however, it is also possible to add from 2 to 10% by weight, based on the overall weight of the monomers used to prepare the polyacrylate resin (A), of trimethylolpropane monoallyl ether to the finished polyacrylate resin. The olefinically unsaturated polyols, such as trimethylolpropane monoallyl ether in particular, may be used as sole hydroxyl-containing monomers or else, in particular, may be used proportionately in combination with others of the abovementioned hydroxyl-containing monomers (a2).

As component (a3) it is possible to use any ethylenically unsaturated monomer which carries per molecule at least one acid group, preferably a carboxyl group, and is copolymerizable with (a1), (a2), (a4), (a5), (a6), and (a7), or a mixture of such monomers. As component (a3) it is particularly preferred to use acrylic acid and/or methacrylic acid. However, it is also possible to use other ethylenically unsaturated carboxylic acids having up to 6 carbon atoms in the molecule. Examples of such acids include ethacrylic acid, crotonic acid, maleic acid, fumaric acid, and itaconic acid. Use may also be made, for example, of ethylenically unsaturated sulfonic or phosphonic acids, and/or their partial esters, as component (a3). It is also possible as component (a3) to use mono(meth)acryloyloxyethyl maleate, succinate, and phthalate.

As optional component (a4) use is made of vinylaromatic hydrocarbons, such as styrene, alpha-alkylstyrenes, and vinyltoluene.

As optional component (a5) use is made of the reaction product of acrylic acid and/or methacrylic acid with the glycidyl ester of an alpha-branched monocarboxylic acid having from 5 to 18 carbon atoms per molecule. The reaction of the acrylic or methacrylic acid with the glycidyl ester of a carboxylic acid having a tertiary alpha carbon atom may take place before, during or after the polymerization reaction. As component (a5) it is preferred to use the reaction product of acrylic and/or methacrylic acid with the glycidyl ester of Versatic acid. This glycidyl ester is available commercially under the name "Cardura E10".

Particular preference—owing to their ready availability—is given to the use of vinyl esters of saturated aliphatic monocarboxylic acids having from 9 to 11 carbon atoms which are branched on the alpha carbon atom.

For the present invention it is important that the polyacrylate resins (A) contain in copolymerized form at least one polysiloxane macromonomer (a6).

Suitable polysiloxane macromonomers (a6) are those having a number-average molecular weight Mn of from 1000 to 40,000, preferably from 2000 to 20,000, with particular preference from 2500 to 10,000, and in particular from 3000 to 7000 daltons and containing on average from 0.5 to 2.5, preferably from 0.5 to 1.5, ethylenically unsaturated double bonds per molecule.

Examples of suitable polysiloxane macromonomers include those described in DE-A-38 07 571 on pages 5 to 7, in DE-A 37 06 095 in columns 3 to 7, in EP-B-0 358 153 on pages 3 to 6, and in U.S. Pat. No. 4,754,014 in columns 5 to 9. Also suitable, furthermore, are other acryloxysilane-containing vinyl monomers having the abovementioned molecular weights and ethylenically unsaturated double bond contents, examples being compounds preparable by reacting hydroxy-functional silanes with epichlorohydrin and then reacting that reaction product with (meth)acrylic acid and/or hydroxyalkyl esters of (meth)acrylic acid.

Particular preference for use as component (a6) is given to the polysiloxane macromonomers cited in DE-A 44 21 823.

Examples of polysiloxane macromonomers suitable as component (a6) are also the compounds specified in the international patent application having the publication no. WO 92/22615 on page 12 line 18 to page 18 line 10.

The polysiloxane macromonomers (a6) are available on the market and are sold, for example, under the brand name Marubeni® AK5 by Toagosei.

The amount of the polysiloxane macromonomer(s) (a6) used is from 0.1 to 20% by weight, preferably from 1 to 15% by weight, with particular preference from 2 to 8% by weight, in particular from 3 to 7% by weight, based in each case on the overall weight of the monomers used to prepare the polyacrylate (A).

As optional component (a7) it is possible to use all ethylenically unsaturated monomers which are copolymerizable with but different from (a1), (a2), (a3), (a4), (a5), and (a6) and are substantially free from acid groups, or mixtures of such monomers.

As component (a7) it is possible to use one or more vinyl esters of alpha-branched monocarboxylic acids having from 5 to 18 carbon atoms in the molecule. The branched monocarboxylic acids may be obtained by reacting formic acid or carbon monoxide and water with olefins in the presence of a liquid, strongly acidic catalyst; the olefins may be cracking products of paraffinic hydrocarbons, such as mineral oil fractions, and may comprise both branched and straight-chain acyclic and/or cycloaliphatic olefins. The reaction of such olefins with formic acid or with carbon monoxide and water gives a mixture of carboxylic acids in which the carboxyl groups are located predominantly on a quaternary carbon atom. Other olefinic starting materials are, for example, propylene trimer, propylene tetramer, and diisobutylene. Alternatively, the vinyl esters may be compared in conventional manner from the acids, by reacting the acid with acetylene, for example.

Acrylate resins (A) used with particular preference are obtained by polymerizing (a1) from 5 to 80% by weight, preferably from 10 to 70% by weight, of component (a1), (a2) from 3 to 45% by weight, preferably from 15 to 35% by weight, of component (a2), (a3) from 0.1 to 15% by weight, preferably from 0.5 to 5% by weight, of component (a3), (a4) up to 50% by weight, preferably from 15 to 45% by weight, of component (a4), (a5) up to 50% by weight, preferably from 15 to 35% by weight, of component (a5), (a6) from 0.1 to 20% by weight, preferably from 1 to 15% by weight, of component (a6), and (a7) up to 30% by weight, preferably up to 25% by weight, of component (a7), the sum of the weight fractions of components (a1) to (a7) being in each case 100% by weight.

The polyacrylate resins (A) used in accordance with the invention are prepared in an organic solvent or solvent mixture and in the presence of at least one polymerization initiator, and in the presence or absence of a regulator. Organic solvents, polymerization initiators, and regulators used are the solvents, regulators, and polymerization initiators that are customary for the preparation of polyacrylate resins. The solvents may participate in the reaction with the crosslinking component (B) and so act as reactive diluents.

Examples of suitable solvents include butyl glycol, 2-methoxypropanol, n-butanol, methoxybutanol, n-propanol, ethylene glycol monomethyl ether, ethylene glycol monoethyl ether, ethylene glycol monobutyl ether, diethylene glycol monomethyl ether, diethylene glycol monoethyl ether, diethylene glycol diethyl ether, diethylene glycol monobutyl ether, trimethylolpropane, ethyl 2-hydroxypropionate, and 3-methyl-3-hydroxybutanol, and also propylene glycol-based derivatives, e.g., ethyl ethoxypropionate, isopropoxypropanol, methoxypropyl acetate, and the like.

Examples of suitable reactive diluents are oligomeric polyols, which are obtainable from oligomeric intermediates themselves obtained by metathesis reactions of acyclic monoolefins and cyclic monoolefins by hydroformylation and subsequent hydrogenation; examples of suitable cyclic monoolefins are cyclo-butene, cyclopentene, cyclohexene, cyclooctene, cyclo-heptene, norbornene or 7-oxanorbornene; examples of suitable acyclic monoolefins are present in hydrocarbon mixtures obtained in petroleum processing by cracking ($C_5$ cut); examples of suitable oligomeric polyols for use in accordance with the invention have a hydroxyl number (OHN) of from 200 to 450, a number-average molecular weight Mn of from 400 to 1000, and a mass-average molecular weight $M_w$ from 600 to 1100;

Further examples of suitable reactive diluents are branched, cyclic and/or acyclic $C_9$-$C_{16}$ alkanes functionalized with at least two hydroxyl groups, especially diethyloctanediols, and also cyclohexane-dimethanol, neopentyl glycol hydroxypivalate, neopentyl glycol, trimethylolpropane or pentaerythritol.

Further examples of suitable reactive diluents are dendrimers or hyperbranched compounds, which are prepared from tetrols as compounds forming the central groups, dicarboxylic acids and/or their anhydrides, and Versatic® acid glycidyl ester.

Examples of suitable polymerization initiators are initiators which form free radicals, such as tert-butyl peroxyethyl hexanoate, benzoyl peroxide, azobisiso-butyronitrile, and tert-butyl perbenzoate, for example. The initiators are used preferably in an amount of from 2 to 25% by weight, with particular preference from 4 to 10% by weight, based on the overall weight of the monomers.

Examples of suitable regulators that may be mentioned include mercaptans, such as mercaptoethanol, thioglycolic esters, and chlorinated hydrocarbons and the like, for example. The regulators are used preferably in an amount of from 0.1 to 15% by weight, with particular preference from 0.5 to 5% by weight, based on the overall weight of the monomers.

The polymerization is judiciously conducted at a temperature of from 80 to 160 degrees C., preferably from 110 to 160° C.

If desired, the coating compositions of the invention may further comprise up to 25% by weight, based on the overall amount of the binders (A), of one or more hydroxyl-containing binders other than the components (A), such as linear and/or branched and/or block, comb and/or random poly(meth)acrylates, polyesters, poly-urethanes, acrylated polyurethanes, acrylated poly-esters, polylactones, polycarbonates, polyethers, (meth)acrylatediols or polyureas.

Used in accordance with the invention as crosslinking agents (B) are tris(alkoxycarbonylamino)triazines of the general formula I.

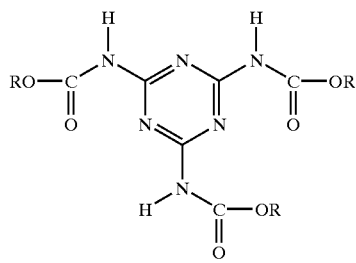

(I)

Examples of suitable tris(alkoxycarbonylamino)triazines are described in the patents U.S. Pat. Nos. 4,939,213, 5,084,541, and EP-A-0 624 577. Use is made in particular of the tris(methoxy-, tris(butoxy- and/or tris(2-ethylhexoxycarbonylamino)triazines.

The invention prefers the methyl butyl mixed esters, the butyl 2-ethylhexyl mixed esters, and the butyl esters. These have the advantage over the straight methyl ester of improved solubility in polymer melts, and also have less of a tendency to crystallize.

The tris(alkoxycarbonylamino)triazines may also be used in a mixture with conventional crosslinking agents.

Suitable such crosslinking agents include, in particular, polyisocyanates or block polyisocyanates, other than the tris(alkoxycarbonylamino)triazines, which are referred to by those in the art as paint polyisocyanates.

It is also possible to use amino resins, examples being melamine resins. In this context it is possible to use any amino resins suitable for transparent topcoats or clearcoats, or a mixture of such amino resins. Particularly suitable are the customary and known amino resins some of whose methylol and/or methoxymethyl groups have been defunctionalized by means of carbamate or allophanate groups. Crosslinking agents of this kind are described in the patents U.S. Pat. Nos. 4,710,542 and EP-B-0 245 700 and also in the article by B. Singh and coworkers entitled "Carbamylmethylated Melamines, Novel Crosslinkers for the Coatings Industry" in Advanced Organic Coatings Science and Technology Series, 1991, volume 13, pages 193 to 207.

The coating compositions of the invention may comprise customary and known additives in customary and known, effective amounts.

Examples of suitable additives are crosslinking catalysts, initiators, especially photoinitiators, fillers, reinforcing fillers, rheological aids, solvents, wetting agents, dispersants, defoamers, adhesion promoters, additives for improving substrate wetting, additives for improving surface smoothness, flatting agents, leveling agents, film-forming auxiliaries, dryers, antiskinning agents, light stabilizers, corrosion inhibitors, biocides, flame retardants, polymerization inhibitors, especially photoinhibitors, or plasticizers, as are customary and known, for example, in the plastics or coatings sector.

Where the coating composition of the invention is to be used for purposes other than the production of clearcoats, such as to produce primers, primer-surfacers, effect coats or basecoats, for instance, it may further comprise pigments, including effect pigments, or dyes.

The selection of the additives is guided by the desired profile of properties of the coating compositions of the invention and may therefore be made by the skilled worker in a simple way, with or without the assistance of simple preliminary tests.

The preparation of the coating compositions of the invention has no special procedural features but may instead take place in a customary and known way by mixing of the components in appropriate installations, such as in stirred tanks or dissolvers, for example.

The coating composition of the invention is outstandingly suitable for the coating of different substrates with clearcoats, especially with multicoat clearcoats.

The multicoat clearcoats of the invention, especially the two-coat clearcoats, comprise at least one first clearcoat film which is obtainable from a customary and known clearcoat material. Materials suitable in this context include not only the conventional one- or two-component clearcoat materials, which commonly include hydroxyl-containing binders and amino resins and/or blocked and unblocked polyisocyanates as crosslinkers, but also powder slurry clearcoat materials, as are known, for example, from the German patent DE-A-196 13 547.

The multicoat clearcoats of the invention further comprise a clearcoat film which is prepared from the coating composition of the invention. In accordance with the invention, this clearcoat film forms the outermost coat.

In accordance with the procedure of the invention, the multicoat clearcoats of the invention are produced by applying, in a first process step, at least one customary and known clearcoat material to the substrate. In a second process step, the coating composition of the invention is then applied and is likewise baked.

The substrates may comprise wood, glass, plastic or metal. The substrates may already have been coated with customary and known coating compositions, such as primers, primer-surfacers, effect coating films or basecoat films. Accordingly, the coating composition of the invention may be used with advantage in the technological fields of the coating of furniture, industrial coating, or automotive finishing.

In the field of automotive finishing, the coating composition of the invention is especially suitable for the production of multicoat topcoats by the wet-on-wet technique, as is described, for example, in the patents U.S. Pat. No. 3,639, 147, DE-A-33 33 072, DE-A-38 14 853, GB-A-2 012 191, U.S. Pat. No. 3,953,644, EP-A-0 260 447, DE-A-39 03 804, EP-A-0 320 552, DE-A-36 28 124, U.S. Pat. No. 4,719,132, EP-A-0 297 576, EP-A-0 069 936, EP-A-0 089 497, EP-A-0 195 931, EP-A-0 228 003, EP-A-0 038 127 and DE-A-28 18 100. In this procedure the coating composition of the invention is used in place of customary and known clearcoat materials.

In particular, however, the coating composition of the invention is suitable for producing multicoat topcoats by the process of the invention, resulting in the topcoat of the invention.

For the process of the invention it is likewise possible to use the aforementioned substrates of glass, wood, plastic or metal, but especially of metal. In a first process step, a pigmented basecoat material is applied conventionally to these substrates. Examples of suitable basecoat materials are given in the aforementioned patents.

In the second process step, the resulting basecoat film is dried, after which, in the third process step, a customary and known, nonaqueous transparent clearcoat material is applied to the basecoat film.

In a fourth process step, the basecoat film and the clearcoat film are baked together.

In the fifth process step, in the procedure of the invention, the coating composition of the invention is applied and is likewise baked, so giving the topcoat of the invention.

Viewed in terms of its procedure, the process of the invention has no special features but instead employs the application, drying, and baking techniques which are customary and known in this technical field. For these, reference may be made by way of example to the abovementioned patents.

The thickness of the clearcoat film prepared from the coating composition of the invention is exclusively a function—for both the topcoat of the invention and the multicoat clearcoat of the invention—of the amount of the coating composition of the invention that is needed in order to achieve the particular desired technical and/or visual effect. It follows from this that the skilled worker will aim to use a just-sufficient thickness, in order to save material. Accordingly, in each particular case the skilled worker is able to determine this thickness on the basis of simple preliminary tests. The thickness is generally from 2 to 50, preferably from 3 to 40, with particular preference from 5 to 30, and in particular from 10 to 25 µm.

The multicoat clearcoat of the invention and the topcoat of the invention have particular advantages. For instance, with a minimum deployment of polysiloxane macromonomers they are extremely scratch-resistant and have a pronounced "maintenance free" effect. Not least, the clearcoat films prepared from the coating composition of the invention adhere outstandingly to the clearcoat films situated beneath them. Consequently, the multicoat clearcoat of the invention and topcoat of the invention are suitable for all applications which are customarily envisaged for clearcoats. In particular, however, they are suitable for automotive OEM finishing or original finishing, where particularly stringent requirements are imposed on the part of the automobile manufacturers and the buyers.

EXAMPLES

Preparation Example

Preparation of a Polyacrylate (A) for Use in Accordance with the Invention

A laboratory reactor with a useful volume of 4 l, equipped with a stirrer, two dropping funnels for the monomer feed and initiator feed, a nitrogen inlet pipe, a thermometer, and a reflux condenser was charged with 879 g of a fraction of aromatic hydrocarbons having a boiling range from 158 to 172° C. and 72.4 g of a polysiloxane macromonomer having a molecular weight of 5000 daltons (Marubeni® AK5 from Toagosei). The mixture was heated to 140° C. Thereafter a monomer mixture containing 290 g of cyclohexyl methacrylate, 709 g of n-butyl methacrylate, 433 g of 4-hydroxybutyl acrylate and 15 g of acrylic acid, over the course of four hours, and also an initiator solution containing 87 g of tert-butyl perethylhexanoate in 87 g of the above-described aromatic hydrocarbons fraction, over the course of 4.5 hours, were metered into the reactor at a uniform rate. The additions of the monomer mixture and of the initiator solution were commenced simultaneously. After the end of the initiator feed, the reaction mixture was stirred at 140° C. for two hours more and then cooled. The resulting solution of the polyacrylate (A) had a solids content of 62% (determined in a forced-air oven; one hour at 130° C.) and an acid number of 9.0 mg KOH/g, based on the solids.

Example

The Preparation of the Coating Composition of the Invention and the Production of the Multicoat Topcoat of the Invention, and the Testing of its Mechanical and Technological Properties 1. The Preparation of the Coating Composition of the Invention and the Production of the Multicoat Topcoat of the Invention The solution of the polyacrylate (A) from Preparation Example 1 was mixed in stoichiometric ratio, with regard to the hydroxyl groups it contained, with a 50% strength by weight solution of a tris(alkoxycarbonylamino)triazine (methyl butyl mixed ester). To improve the leveling, 1% by weight of a 2% strength by weight solution of a commercially customary silicone leveling additive was added. The resulting coating composition of the invention was adjusted to a spray viscosity of 28 s (DIN 4 at 23° C.) using a solvent mixture of 40% butyl diglycol and 60% xylene. It was applied as a second film over the baked commercially customary one-component clearcoat (hydroxyl-containing polyacrylate as binder and amino resins and blocked polyisocyanates as crosslinking agents) of a multicoat coating produced on a substrate by the wet-on-wet technique using a commercially customary black basecoat material.

The substrates used were metal panels which had been coated with a customary and known electrocoat and with a customary and known primer-surfacer.

The applied coating composition of the invention was baked at 140° C. for 20 minutes.

This gave test panels of the invention which had an electrocoat with a coat thickness of 18–22 µm, then a primer-surfacer with a coat thickness of 35–40 µm then a black basecoat with a coat thickness of 12–15 µm, then a clearcoat with a coat thickness of 40–45 µm, and finally the clearcoat produced from the coating composition of the invention, with a coat thickness of 10–14 µm. Following application of the coating materials, the panels were stored at room temperature for at least 2 weeks before testing was carried out.

2. The Testing of the Mechanical and Technological Properties of the Test Panels of the Invention 2.1 The Scratch Resistance by the Brush Test The scratch resistance of the two-coat clearcoat of the invention on the test panels of the invention was assessed as follows with the aid of the BASF brush test described in FIG. 2 on page 28 of the article by P. Betz and A. Bartelt, Progress in Organic Coatings 22 (1993) 27–37, albeit with modification in respect of the weight used (2000 g instead of the 280 g specified therein):

In the test, the film surface was damaged using a weighted mesh fabric. The mesh fabric and the film surface were wetted generously with a laundry detergent solution. The test panel was moved forward and backward in reciprocal movements under the mesh fabric by means of a motor drive.

The test body was an eraser (4.5×2.0 cm, broad side perpendicular to the direction of scratching) lined with nylon mesh fabric (no. 11, 31 µm mesh size, Tg 50° C.). The applied weight was 2000 g.

Prior to each test, the mesh fabric was replaced, with the running direction of the fabric meshes parallel to the direction of scratching. Using a pipette, about 1 ml of a freshly stirred 0.25% strength Persil solution was applied in front of the eraser. The rotary speed of the motor was set so that 80 double strokes were performed within a period of 80 s. Following the test, the remaining washing liquid was rinsed off with cold tap water and the test panels were blown dry using compressed air. Measurements were made of the gloss (20°) to DIN 67530 before and after damage (direction of measurement perpendicular to the direction of scratching).

Prior to damage, the test panels had a gloss of 87, which as a result of the damage fell by only dgloss 10. This underscores the outstanding scratch resistance of the two-coat clearcoat of the invention.

2.2 The Chemical Resistance by the BART Test

The BART (BASF ACID RESISTANCE TEST) was used to determine the resistance of film surfaces to acids, alkalis, and water droplets. After baking, the coating was subjected to further temperature stresses in a gradient oven (30 min at 40° C., 50° C., 60° C., and 70° C.). Beforehand the test substances (1%, 10% and 36% sulfuric acid; 6% sulfurous acid; 10% hydrochloric acid; 5% sodium hydroxide solution; DI (i.e., deionized) water—1, 2, 3 or 4 drops in each case) had been applied in a defined manner using a volumetric pipette. After the substances had been allowed to act, they were removed under running water and the damage was assessed visually after 24 h in accordance with a predetermined scale:

| Rate | Appearance |
|---|---|
| 0 | no defect |
| 1 | slight marking |
| 2 | marking/matting/no softening |
| 3 | marking/matting/color change/softening |
| 4 | cracks/incipient through-etching |
| 5 | clearcoat removed |

Each individual mark (spot) was evaluated and the result was recorded in an appropriate form (e.g., sums of the ratings for one temperature). Table 2 gives an overview of the results obtained.

TABLE 2

The results of the BART test

| Temperature (° C.) | 40 | 50 | 60 | 70 |
|---|---|---|---|---|
| 1% $H_2SO_4$ | 0 | 0 | 0.5 | 3.5 |
| 10% $H_2SO_4$ | 0 | 0 | 0.5 | 3.5 |
| 36% $H_2SO_4$ | 0.5 | 0.5 | 1.0 | 3.5 |
| 10% HCl | 0 | 0.5 | 0.5 | 1 |
| 5% $H_2SO_3$ | 0 | 0 | 0 | 2 |
| 5% NaOH | 0 | 0 | 0 | 1 |
| DI water 1 | 0 | 0 | 0 | 1 |
| DI water 2 | 0 | 0 | 0 | 1 |
| DI water 3 | 0 | 0 | 0 | 1 |
| DI water 4 | 0 | 0 | 0 | 1 |
| Sum acid | 0.5 | 1.0 | 2.5 | 14.5 |
| Sum water | 0 | 0 | 0 | 4 |

The results of Table 2 demonstrate the outstanding chemical resistance of the two-coat clearcoat of the invention.

2.3 Contact Angle and Surface Slip

The contact angle was determined in a customary and known manner, visually, from the shadow projection of the water droplet contour. The contact angle was 99°. This demonstrated that the two-coat clearcoat of the invention had an excellent "maintenance free" effect.

The surface slip was measured using the slip meter MOD 9505AE—SERIAL 7035-0689-2 from ALTEK, P.O. Box 1128, Torrington, Conn. 06790, USA. In this measurement, a weight provided with three hemispheres was pulled at a constant force over the surface of the test panels. The frictional resistance which occurred when this was done was plotted graphically, as a dimensionless variable, using an x/y plotter. The height of the resultant peak is a relative measure of the lubricity of the surface in question: the lower the height, the more lubricious the surface.

In this test, the two-coat clearcoat of the invention had a relative peak height of 0.01. For comparison, the commercially customary clearcoat used to produce the two-coat clearcoat of the invention had a relative peak height of 0.0475.

What is claimed is:

1. A coating composition comprising
   A) a binder comprising at least one hydroxyl-containing polyacrylate containing in copolymerized form at least one polysiloxane macromonomer, and
   B) a crosslinking agent comprising at least one tris (alkoxycarbonylamino)triazine
   wherein the polyacrylate (A) contains the polysiloxane macromonomer in copolymerized form in an amount, based on the polyacrylate (A), of from 0.1 to 20% by weight.

2. The coating composition as claimed in claim 1, wherein the polyacrylate (A) comprises a reaction product of a hydroxyl containing (meth)acrylate and a polysiloxane macromonomer, wherein the hydroxyl containing (meth)acrylate is selected from the group consisting of 2-hydroxyethyl acrylate, 2-hydroxypropyl acrylate, 3-hydroxypropyl acrylate, 2-bydroxypropyl methacrylate, 3-hydroxylpropyl methacrylate, 2-hydroxyethyl metacrylate, 4-hydroxybutyl acrylate, 4-hydroxybutyl methacrylate, methylpropanediol monoacrylate, methylpropanediol monomethacrylate, hydroxystearyl acrylate, hydroxystearyl methacrylate, and mixtures thereof.

3. The coating composition as claimed in claim 1, wherein the polysiloxane macromonomer has a number-average molecular weight of from 1000 to 40,000, and contains on average from 0.5 to 2.5 ethylenically unsaturated double bonds per molecule.

4. A coating comprising a coating product of the coating composition as claimed in claim 1, wherein the coating is one of a clearcoat, a multicoat clearcoat, and a multicoat topcoat.

5. A process for producing multicoat clearcoats on a substrate, comprising
   (1) applying at least one clearcoat film to the substrate surface and baking, and then
   (2) applying the coating composition as claimed in claim 1 and baking.

6. A process for producing a multicoat topcoat on a substrate, comprising
   (1) applying a pigmented basecoat material to the substrate surfaces,
   (2) drying the basecoat film applied in process step (1),
   (3) applying a nonaqueous transparent clearcoat material to the basecoat film dried in process step (2),
   (4) and then baking together the basecoat film and the clearcoat film, followed by
   (5) applying a further clearcoat film of the coating composition as claimed in claim 1, and then
   (6) baking the clearcoat film of step (5).

7. A multicoat clearcoat comprising
   (I) at least one clearcoat and
   (II) at least one clearcoat obtained from the coating composition as claimed in claim 1.

8. A multicoat topcoat comprising
   (I) at least one basecoat and
   (II) at least one clearcoat and
   (III) at least one clearcoat obtained from the coating composition as claimed in claim 1.

9. The coating composition as claimed in claim 1, wherein the polyacrylate (A) contains the polysiloxane macromonomer in copolymerized form in an amount, based on the polyacrylate (A), of from 1 to 15% by weight.

10. The coating composition as claimed in claim 1, wherein the polyacrylate (A) contains the polysiloxane macromonomer in copolymerized form in an amount, based on the polyacrylate (A), of from 2 to 10% by weight.

11. The coating composition as claimed in claim 1, wherein the polyacrylate (A) contains the polysiloxane macromonomer in copolymerized form in an amount, based on the polyacrylate (A), of from 3 to 7% by weight.

12. The coating composition as claimed in claim 1, wherein the polysiloxane macromonomer has a number-average molecular weight of from 2000 to 20,000 and contains on average from 0.5 to 1.5, ethylenically unsaturated double bonds per molecule.

13. The coating composition as claimed in claim 1, wherein the polysiloxane macromonomer has a number-average molecular weight of from 3000 to 7000 and from 0.5 to 1.5, ethylenically unsaturated double bonds per molecule.

* * * * *